United States Patent
Bennett

(10) Patent No.: US 8,344,237 B1
(45) Date of Patent: Jan. 1, 2013

(54) AMTEC POWER SYSTEM

(75) Inventor: Mark D. Bennett, Benld, IL (US)

(73) Assignee: The Boeing Company, Chicago, IL (US)

( * ) Notice: Subject to any disclaimer, the term of this patent is extended or adjusted under 35 U.S.C. 154(b) by 386 days.

(21) Appl. No.: 12/606,699

(22) Filed: Oct. 27, 2009

(51) Int. Cl.
*H01L 35/30* (2006.01)
*H01L 35/00* (2006.01)
*H01L 37/00* (2006.01)

(52) U.S. Cl. ........................ 136/205; 136/206

(58) Field of Classification Search ............... 136/205, 136/211, 212, 246, 206
See application file for complete search history.

(56) References Cited

U.S. PATENT DOCUMENTS

| | | | |
|---|---|---|---|
| 4,055,948 A | 11/1977 | Kraus et al. | |
| 4,148,300 A * | 4/1979 | Kaufman, Sr. | 126/684 |
| 4,188,941 A | 2/1980 | Hopkins | |
| 4,292,579 A | 9/1981 | Constant | |
| 4,459,970 A | 7/1984 | Clee | |
| 4,510,210 A | 4/1985 | Hunt | |
| 4,545,366 A | 10/1985 | O'Neill | |
| 4,835,071 A | 5/1989 | Williams et al. | |
| 4,857,421 A * | 8/1989 | Ernst | 429/104 |
| 5,085,948 A | 2/1992 | Tsukamoto et al. | |
| 5,143,051 A * | 9/1992 | Bennett | 126/561 |
| 5,317,145 A | 5/1994 | Corio | |
| 5,441,575 A | 8/1995 | Underwood et al. | |
| 5,518,554 A | 5/1996 | Newman | |
| 5,942,719 A | 8/1999 | Sievers et al. | |
| 6,313,391 B1 * | 11/2001 | Abbott | 136/200 |
| 6,656,238 B1 | 12/2003 | Rogers et al. | |
| 7,431,570 B2 | 10/2008 | Young et al. | |
| 2001/0008121 A1 | 7/2001 | Tanabe et al. | |
| 2003/0037814 A1 | 2/2003 | Cohen et al. | |
| 2004/0101750 A1 | 5/2004 | Burch | |
| 2005/0223632 A1 | 10/2005 | Matviya et al. | |
| 2006/0086118 A1 * | 4/2006 | Venkatasubramanian et al. | 62/259.2 |
| 2006/0231133 A1 * | 10/2006 | Fork et al. | 136/246 |
| 2006/0243317 A1 | 11/2006 | Venkatasubramanian | |

(Continued)

FOREIGN PATENT DOCUMENTS

DE 4028403 3/1992

(Continued)

OTHER PUBLICATIONS

Buschle, J. et al. (2006) Latent Heat Storage for Process Heat Applications, ECOSTOCK 2006, Stockton, New Jersey, 31.5-2.6.2006.*

(Continued)

*Primary Examiner* — Jennifer Michener
*Assistant Examiner* — Eli Mekhlin
(74) *Attorney, Agent, or Firm* — John A. Lepore

(57) ABSTRACT

A power system including a primary optical element that defines a first opening therein, a secondary optical element positioned relative to the primary optical element to direct energy from the primary optical element to the first opening, and a thermal absorber, wherein the thermal absorber includes a housing that defines an internal volume and a second opening into the internal volume, wherein the second opening is coupled with the first opening, a window sealingly connected to the second opening to enclose the internal volume, a barrier wall that divides the internal volume into at least a hot chamber and a cold chamber, and at least one AMTEC cell having a first portion received in the cold chamber and a second portion received in the hot chamber.

20 Claims, 2 Drawing Sheets

U.S. PATENT DOCUMENTS

2008/0000516 A1* 1/2008 Shifman .................. 136/246

FOREIGN PATENT DOCUMENTS

| DE | 4028404 | 3/1992 |
|----|---------|--------|
| DE | 4028406 | 3/1992 |
| DE | 10033157 | 1/2002 |

OTHER PUBLICATIONS

PCT, International Search Report and Written Opinion, International Application No. PCT/US2010/044140 (Dec. 7, 2010).

Schock, A. et al., "Design, Analyses, and Fabrication Procedure of AMTEC Cell, Test Assembly, and Radioisotope Power System for Outer-Planet Missions," *Acta Astronautica*, vol. 50, No. 8, pp. 471-510 (2002).

Sievers, R.K. et al., "Alkali Metal Thermal to Electric Conversion," *Mechanical Engineering* (11 pages) (1995).

Product literature, "Product Data Sheet: CFOAM® Carbon Foams," by Touchstone Research Laboratory, Triadelphia, West Virginia (2 pages), 2008.

"CFOAM® Product Overview," web page by Touchstone Research Laboratory, Ltd., http://www.cfoam.com/whatis.htm (2 pages), 2008.

"CFOAM® Carbon Foam Insulation Applications," web page by Touchstone Research Laboratory, Ltd., http://www.cfoam.com/insulation.htm (1 page), 2008.

Bossman, DE 4028406, Mar. 12, 1992, machine translation (8 pages).

Insaco, Alumina Properties, Mar. 2, 2006, http://www.azom.com/article.aspx?ArticleID=3269.

Touchstone Labs, Carbon foam insulation applications, Jul. 4, 2007, www.cfoam.com/insulation.htm (via wayback machine).

Powell, R.W. et al., "Thermal conductivity of Selected Materials," National Standard Reference Data System, U.S. Department of Commerce, pp. 1-20 (1966).

Zalba, B. et al., "Review on thermal energy storage with phase change: materials, heat transfer analysis and applications," Applied Thermal Engineering, vol. 23, pp. 251-283 (2003).

\* cited by examiner

AMTEC POWER SYSTEM

FIELD

The present patent application relates to concentrating solar power systems and, more particularly, to solar alkali metal thermal-to-electric converter ("AMTEC") power systems.

BACKGROUND

Concentrating solar power systems employ optical elements, such as mirrors and lenses, to focus a large area of incoming sunlight into a concentrated location. For example, parabolic trough concentrating solar power systems employ elongated parabolic mirrors that focus incoming sunlight on elongated receivers supported over the mirrors. The entire parabolic trough assembly may be supported on a tracker that maintains precise alignment of the mirrors with the sun as the sun moves across the sky.

AMTEC power systems are configured to take advantage of temperature gradients across an AMTEC cell to convert thermal energy directly into electrical energy. A typical AMTEC cell includes a beta-alumina solid electrolyte ("BASE"), which is an electronic insulator and an ionic conductor. In an AMTEC power system, the AMTEC cell defines a barrier between a hot side and a cold side and the opposing sides of the cell are electrically coupled through an external load circuit. When an alkali metal, such as sodium, is heated on the hot side of the cell, the sodium metal gives up electrons which pass through the load circuit while corresponding sodium ions pass through the electrolyte to the cold side of the system, thereby driving an electric current. At the cold side, sodium ions are neutralized by the electrons returning from the load circuit to yield condensed sodium metal, which may then be recycled to the hot side of the system.

Solar AMTEC power systems utilize concentrating solar power optical systems to generate the required temperature gradient across the AMTEC cell that drives the electric current. However, existing solar AMTEC power systems employ complex mechanisms, such as pumps and wicks, for regenerating the condensed alkali metal. Such regeneration mechanisms increase the overall cost of such systems and, if they contain moving parts, substantially increase the likelihood of failure.

Accordingly, those skilled in the art continue to seek advances in the field of AMTEC power systems.

SUMMARY

In one aspect, the disclosed AMTEC power system may include a primary optical element that defines a first opening therein, a secondary optical element positioned relative to the primary optical element to direct energy from the primary optical element to the first opening, and a thermal absorber, wherein the thermal absorber includes a housing that defines an internal volume and a second opening into the internal volume, wherein the second opening is coupled with the first opening, a window sealingly connected to the second opening to enclose the internal volume, a barrier wall that divides the internal volume into at least a hot chamber and a cold chamber, and at least one AMTEC cell having a first portion received in the cold chamber and a second portion received in the hot chamber.

In another aspect, the disclosed AMTEC power system may include a parabolic dish-shaped mirror that defines a first opening therein, an optical element positioned relative to the dish-shaped mirror to direct energy reflected from the dish-shaped mirror to the first opening, and a thermal absorber that includes a housing that defines an internal volume and a second opening into the internal volume, wherein the second opening is connected to the first opening, an alkali metal received in the internal volume, a window sealingly connected to the second opening to enclose the alkali metal within the internal volume, a barrier wall that divides the internal volume into a hot chamber, a cold chamber and a return track, wherein the return track is in fluid communication with both the hot and cold chambers, and at least one AMTEC cell having a first portion received in the cold chamber and a second portion received in the hot chamber.

Other aspects of the disclosed AMTEC power system will become apparent from the following description, the accompanying drawings and the appended claims.

DETAILED DESCRIPTION

Figure 1:
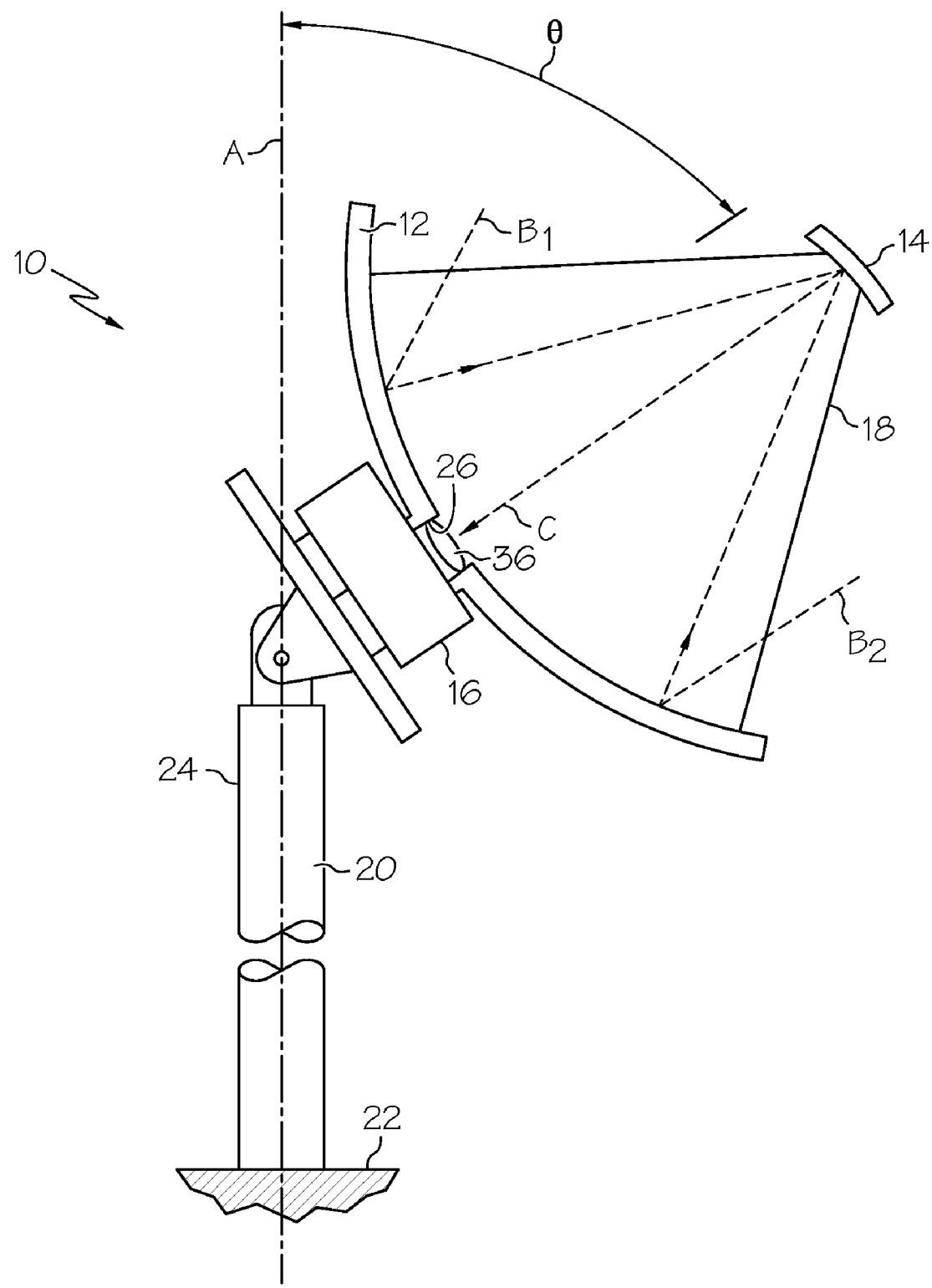
FIG. 1 is a schematic side elevational view of an AMTEC power system in accordance with one aspect of the present disclosure.

Referring to FIG. 1, one aspect of the disclosed AMTEC power system, generally designated 10, may include a primary optical element 12, a secondary optical element 14, a thermal absorber 16, a mirror support structure 18 and an assembly support structure 20. The thermal absorber 16 may generate an electric current and, therefore, may be electrically coupled to an external load (not shown).

The assembly support structure 20 may support the thermal absorber 16 and associated primary and secondary optical elements 12, 14 relative to a sub-structure 22 (e.g., the ground). In one aspect, the assembly support structure 20 may include an elongated mast 24 that defines a vertical axis A, and which supports the primary optical element 12 at an angle θ (e.g., 30 degrees) relative to the vertical axis A. In one particular aspect, the assembly support structure 20 may be, or may include, a tracking mechanism configured to maintain precise alignment between the primary optical element 12 and the energy source (not shown) (e.g., the sun) by, for example, rotating the mast 24 about the vertical axis A and/or selectively adjusting the angle θ of the primary optical element 12 relative to the vertical axis A.

The mirror support structure 18 may support the secondary optical element 14 relative to the primary optical element 12 such that incoming energy (e.g., sunlight) is directed from the primary optical element 12 to the secondary optical element 14, as shown by arrows $B_1$, $B_2$, and, ultimately, to an opening 26 in the primary optical element 12, as shown by arrow C. At this point, those skilled in the art will appreciate that the primary and secondary optical elements 12, 14 may cooperate to concentrate incoming energy from a large area into the relatively smaller thermal absorber 16.

The primary optical element 12 may be any structure capable of focusing incoming energy onto the secondary optical element 14. For example, as shown in FIG. 1, the primary optical element 12 may be a parabolic dish-shaped mirror.

The secondary optical element 14 may be any structure capable of focusing incoming energy from the primary optical element 14 through the opening 26 in the primary optical element 14. For example, as shown in FIG. 1, the secondary optical element 14 may be a parabolic dish-shaped mirror.

Figure 2:
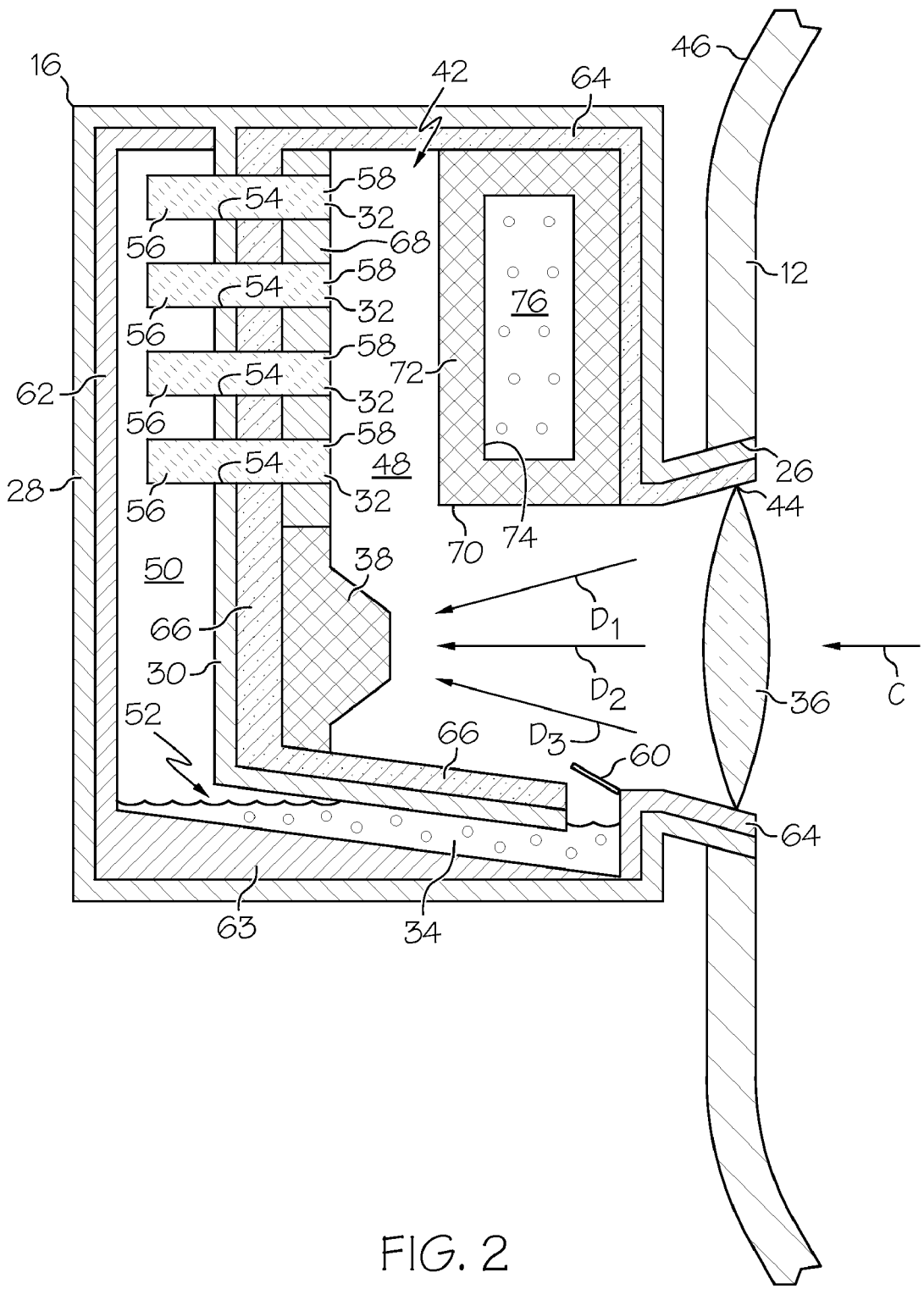
FIG. 2 is a schematic cross-sectional view of the thermal absorber of the AMTEC power system shown in FIG. 1.

Referring to FIG. 2, the thermal absorber 16 may include a housing 28, a barrier wall 30, one or more AMTEC cells 32, an alkali metal 34 and a window 36. Optionally, the thermal absorber 16 may additionally include a flux extractor 38, which may be a mass of thermally conductive material, such as solid graphite, and, therefore, may have thermal energy storage capabilities. Those skilled in the art will appreciate that the thermal absorber 16 may additionally include various other features and components without departing from the scope of the present disclosure.

The housing 28 of the thermal absorber 16 may define an internal volume 42 and an opening 44 that provides access into the internal volume 42 of the housing 28. The thermal absorber 16 may be disposed adjacent to the backside 46 of the primary optical element 12 such that the opening 44 defined by the housing 28 may be coupled with the opening 26 defined by the primary optical element 12. The window 36 may be sealingly coupled to the opening 44 defined by the housing 28 to fully enclose the internal volume 42 of the housing 28. For example, an adhesive or interference fit may be used to couple the window 36 to the opening 44 of the housing 28.

The housing 28 may be formed from a generally rigid material, such as aluminum, steel (e.g., stainless steel) or the like. Appropriate non-metal materials may also be used, such as plastic. For example, the housing 28 may be constructed from internally or structurally reinforced plastic. Those skilled in the art will appreciate that the housing 28 may be constructed using well known forming techniques, such as cutting and welding.

The barrier wall 30 may extend from the housing 28 and may divide the internal volume 42 into a hot chamber 48 and a cold chamber 50. The barrier wall 30 may further define a return track 52 that fluidly couples the cold chamber 50 with the hot chamber 48. Therefore, the alkali metal 34 may condense in the cold chamber 50 and may pool (by gravity) in the return track 52 until it is vaporized in the hot chamber 48. An optional directional barrier 60 (e.g., a flap) may direct fluid flow from the return track 52 to the hot chamber 48 and may obstruct fluid flow from the hot chamber 48 to the return track 52.

The portion of the housing 28 that defines the cold chamber 50 may be lined with a layer 62 of thermally conductive material, thereby encouraging the radiating of heat from the cold chamber 50. Likewise, the portion of the housing 28 that defines the return track 52 may be lined with a layer 63 of thermally conductive material. As used herein, thermally conductive materials are materials having a thermal conductivity of at least about 100 W/(m·° K), such as at least 200 W/(m·° K). Examples of thermally conductive materials useful in layer 62 include PTM 3180 phase change thermal interface material, which is available from Honeywell of Morris Township, N.J., and POCO HT graphite, which is available from Poco Graphite, Inc. of Decatur, Tex. The portion of the housing 28 that defines the hot chamber 48 may be lined with a layer 64 of thermally insulative material, thereby encouraging the retention of heat within the hot chamber 48. As used herein, thermally insulative materials are materials having a thermal conductivity of at most about 50 W/(m·° K), such as at most about 25 W/(m·° K). An example of a thermally insulative material useful in layer 64 is CFOAM® carbon foam available from Touchstone Research Laboratories, Ltd. of Triadelphia, W. Va. Additionally, the barrier wall 30 may be lined with a layer 66 of thermally insulative material (e.g., CFOAM® carbon foam) to insulate the cold chamber 50 and the return track 52 from the high temperatures of the hot chamber 48, thereby increasing the temperature gradient across the hot and cold chambers 48, 50 that drives the thermoelectric effect.

The barrier wall 30 may define one or more holes 54, and the holes 54 may be sized and shaped to receive and support the AMTEC cells 32 therein. The AMTEC cells 32 may extend through the holes 54 in the barrier wall 30 such that a first portion 56 of each AMTEC cell 32 extends into the cold chamber 50 and a second portion 58 of each AMTEC cell 32 extends into the hot chamber 48. A thermal adhesive (not shown), such as a thermal adhesive available from Dow Corning Corporation of Midland, Mich., may be used to secure the AMTEC cells 32 to the barrier wall 30.

The AMTEC cells 32 may be any AMTEC cells known in the art, and may include an anode (not shown), a cathode (not shown) and an electrolyte (not shown), such as a beta-alumina solid electrolyte. For example, the AMTEC cells may be hollow-rod type AMTEC cells.

The alkali metal 34 may be any material capable of driving an AMTEC system. While sodium metal is currently most commonly used, those skilled in the art will appreciate that other alkali metals, such as lithium, potassium and rubidium, may also be used. Furthermore, those skilled in the art will appreciate that the alkali metal 26 may be substituted with other materials capable of providing the same function in the thermal absorber 10 without departing from the scope of the present disclosure.

The window 36 may be formed from any material that is at least partially transparent to energy (e.g., solar energy) such that incoming energy may penetrate the window 36 and heat the hot chamber 48 to vaporize the alkali metal 34. In one particular aspect, the window 36 may be formed from a material having high light transmittance and low light reflectance. For example, the window 36 may be constructed from glass, such as low-iron glass, or optically clear (or at least partially clear) ceramic. The thickness of the window 36 may be selected to optimize solar energy collection and retention, as well as mechanical strength, which may depend on the environment in which the thermal absorber 16 will be deployed. In another particular aspect, the window 36 may be a lens, such as a diopter convexed/convexed magnifier lens, and may focus incoming energy directly onto the flux extractor 38, as shown by arrows $D_1$, $D_2$, $D_3$, to heat the hot chamber 48.

In one optional aspect, a thermal block 68 of thermally conductive material may be positioned adjacent to at least a portion of the second portion 58 (i.e., the hot side) of the AMTEC cells 32. The term "adjacent" is intended to include an assembly in which the thermal block 68 is positioned in direct contact with the AMTEC cells 32 (e.g., the AMTEC cells 32 extending through the thermal block 68), as well as an assembly in which the thermal block 68 is positioned in close proximity to the AMTEC cells 32.

At this point, those skilled in the art will appreciate that the thermal block 68 may direct thermal energy to the hot side 58 of the AMTEC cells 32. Those skilled in the art will also appreciate that the thermal block 68 may provide the thermal absorber 16 with thermal energy storage capabilities such that thermal energy may continue to be directed to the hot side 58 of the AMTEC cells 32 even when incoming energy has been reduced or ceased.

The thermal block 68 may be constructed from any thermally conductive material capable of withstanding the high temperatures (e.g., temperatures in excess of 600° C.) within the hot chamber 48 of the thermal absorber 16. In one aspect, the thermally conductive material may have a thermal conductivity of at least about 100 W/(m·° K), such as at least about 150 W/(m·° K) or at least about 200 W/(m·° K). In one particular aspect, the thermally conductive material may be a graphitic foam-type material, such POCO HT graphite, which has a thermal conductivity of about 245 W/(m·° K).

In another optional aspect, a thermal energy storage system 70 may be positioned in the hot chamber 48 to receive and store thermal energy. The thermal energy storage system 70 may be a salt-based system wherein a layer 72 of thermally conductive material is assembled to define an internal chamber 74, and wherein a salt 76 is received in the internal chamber 74. The salt 76 in the chamber 74 may be, for example, potassium nitrate, sodium nitrate, sodium nitrite or combinations thereof. The thermally conductive material of layer 72 may be solid graphite or a graphite like material, such as pyrolytic carbon. Pyrolytic carbon is a layered structure that is known to exhibit its greatest thermal conductivity along its cleavage plane, but to act as an insulator in the direction normal to the cleavage plane. For example, pyrolytic carbon may be obtained in sheet form from Graphtek LLC of Buffalo Grove, Ill., and may have a thermal conductivity of about 400 W/(m·° K) in the A-B plane and a thermal conductivity of 3.5 W/(m·° K) in the C plane.

Therefore, in one exemplary aspect, the thermal energy storage system 70 may be constructed by surrounding the salt 76 with sheets of pyrolytic carbon, wherein the sheets may be shaped and oriented to direct thermal energy to the salt in the chamber 74, while insulating the salt in the chamber 98 from the housing 28. A thermal adhesive may be used to connect the sheets of pyrolytic carbon. For example, the pyrolytic carbon may be shaped and oriented such that the cleavage plane is aligned with the salt 76 in the chamber 74.

Accordingly, the primary and secondary optical elements 12, 14 may supply the thermal absorber with incoming energy (arrow C), which may heat the hot chamber 48 to a temperature sufficient to vaporize the alkali metal 34 received in the housing 28. The hot vapor in the hot chamber 48 may interact with the AMTEC cells 32 to generate electricity, as is well known in the art, resulting in condensed alkali metal 34 in the cold chamber 50. The condensed alkali metal 34 may pool, by gravity, in the return track 52 until it is once again vaporized and enters the hot chamber 48. Therefore, the disclosed AMTEC power system 10 utilizes a compound concentrating solar power system and gravity-driven counterflow regeneration of the alkali metal 34.

Although various aspects of the disclosed AMTEC power system have been shown and described, modifications may occur to those skilled in the art upon reading the specification. The present application includes such modifications and is limited only by the scope of the claims.

What is claimed is:

1. A power system comprising:
a primary optical element that defines a first opening therein;
a secondary optical element positioned relative to said primary optical element to direct energy from said primary optical element to said first opening; and
a thermal absorber comprising:
a housing that defines an internal volume and a second opening into said internal volume, wherein said second opening is connected to said first opening;
a window sealingly connected to said second opening to enclose said internal volume;
a barrier wall that divides said internal volume into at least a hot chamber and a cold chamber; and
at least one alkali metal thermal-to-electric converter ("AMTEC") cell, said AMTEC cell having a first portion received in said cold chamber and a second portion received in said hot chamber;
said window positioned to directly transmit said energy into said hot chamber and direct said energy from said secondary optical element into said hot chamber to heat said hot chamber sufficiently to vaporize alkali metal in said hot chamber to interact with said AMTEC cell.

2. The power system of claim 1 further comprising an alkali metal received in said internal volume.

3. The power system of claim 1 wherein said alkali metal is sodium.

4. The power system of claim 1 wherein said primary optical element is a parabolic dish-shaped mirror.

5. The power system of claim 1 wherein said secondary optical element is a parabolic dish-shaped mirror.

6. The power system of claim 1 wherein said window is formed from low iron glass.

7. The power system of claim 1 wherein said window is a lens.

8. The power system of claim 7 wherein said lens is a convexed/convexed lens.

9. The power system of claim 7 wherein said thermal absorber further comprises a thermally conductive material received in said hot chamber, and wherein said lens focuses incoming energy onto said thermally conductive material.

10. The power system of claim 9 wherein said thermally conductive material includes graphite.

11. The power system of claim 9 wherein said thermally conductive material has a thermal conductivity of at least about 200 W/(m·° K).

12. The power system of claim 1 wherein said thermal absorber further comprises a thermally conductive material disposed adjacent to said second portion of said AMTEC cell.

13. The power system of claim 1 wherein said thermal absorber further comprises a thermally conductive material connected to a portion of said housing that defines said cold chamber.

14. The power system of claim 1 wherein said thermal absorber further comprises a thermally insulative material connected to a portion of said housing that defines said hot chamber.

15. The power system of claim 1 wherein said thermal absorber further comprises a thermally insulative material disposed between said hot chamber and said cold chamber.

16. The power system of claim 1 wherein said barrier wall further defines a return track, and wherein said return track is in fluid communication with said hot chamber and said cold chamber.

17. The power system of claim 1 wherein said thermal absorber further comprises a thermal energy storage system received in said hot chamber, said thermal energy storage system comprising a thermally conductive material that defines an internal chamber, and wherein a salt is received in said internal chamber.

18. The power system of claim 17 wherein said salt includes at least one of potassium nitrate, sodium nitrate and sodium nitrite.

19. A power system comprising:
a parabolic dish-shaped mirror that defines a first opening therein;
an optical element positioned relative to said dish-shaped mirror to direct energy reflected from said dish-shaped mirror to said first opening; and
a thermal absorber comprising:

a housing that defines an internal volume and a second opening into said internal volume, wherein said second opening is connected to said first opening;

an alkali metal received in said internal volume;

a window sealingly connected to said second opening to enclose said alkali metal within said internal volume;

a barrier wall that divides said internal volume into a hot chamber, a cold chamber and a return track, wherein said return track is in fluid communication with both said hot chamber and said cold chamber; and at least one AMTEC cell, said AMTEC cell having a first portion received in said cold chamber and a second portion received in said hot chamber;

said window positioned to directly transmit said energy into said hot chamber and direct said energy from said secondary optical element into said hot chamber to heat said hot chamber sufficiently to vaporize said alkali metal in said hot chamber to interact with said AMTEC cell.

20. The power system of claim 19 wherein said thermal absorber is positioned such that gravity directs said alkali metal into said return track.

\* \* \* \* \*